United States Patent
Burrington et al.

(10) Patent No.: US 8,293,119 B2
(45) Date of Patent: Oct. 23, 2012

(54) FILTER CAP ADDITIVE DELIVERY SYSTEM

(75) Inventors: James D. Burrington, Gates Mills, OH (US); Gary A. Garvin, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 64 days.

(21) Appl. No.: 12/901,674

(22) Filed: Oct. 11, 2010

(65) Prior Publication Data

US 2011/0036784 A1 Feb. 17, 2011

Related U.S. Application Data

(62) Division of application No. 11/875,022, filed on Oct. 19, 2007, now abandoned.

(51) Int. Cl.
*F01M 11/03* (2006.01)
*B01D 27/08* (2006.01)

(52) U.S. Cl. .......... 210/749; 210/167.02; 210/206; 210/209; 210/416.4; 210/416.5

(58) Field of Classification Search .......... 210/749, 210/765, 167.02, 167.3, 205, 206, 209, 416.4, 210/416.5; 123/196 A, 1 A
See application file for complete search history.

(56) References Cited

U.S. PATENT DOCUMENTS

| | | | |
|---|---|---|---|
| 2,310,305 A | 2/1943 | Miller et al. | 252/10 |
| 4,014,794 A | 3/1977 | Lewis | 210/199 |
| 4,066,559 A | 1/1978 | Rohde | 252/10 |
| 4,075,098 A | 2/1978 | Paul et al. | 210/168 |
| 4,144,166 A | 3/1979 | DeJovine | 210/60 |
| 4,144,169 A | 3/1979 | Grueschow | 210/168 |
| 4,265,748 A | 5/1981 | Villani et al. | 210/132 |
| 5,209,842 A | 5/1993 | Moor | 210/168 |
| 5,327,861 A | 7/1994 | Rogalla et al. | 123/196 S |
| 5,435,912 A | 7/1995 | Baehler et al. | 210/168 |
| 5,552,040 A | 9/1996 | Baehler et al. | 210/168 |
| 5,591,330 A | 1/1997 | Lefebvre | 210/203 |
| 5,718,258 A | 2/1998 | Lefebvre et al. | 137/268 |
| 5,843,284 A | 12/1998 | Waters et al. | 196/46.1 |
| 6,045,692 A | 4/2000 | Bilski et al. | 210/198.1 |
| 6,374,797 B1 | 4/2002 | Fischer | 123/196 R |
| 6,379,564 B1 | 4/2002 | Rohrbach et al. | 210/765 |
| 6,495,495 B1 | 12/2002 | Alger et al. | 508/475 |
| 6,505,597 B2 | 1/2003 | Zulauf et al. | 123/196 R |
| 6,843,916 B2 | 1/2005 | Burrington et al. | 210/416.5 |
| 6,860,241 B2 | 3/2005 | Martin et al. | 123/1 A |

(Continued)

FOREIGN PATENT DOCUMENTS

CA 2087773 7/1993

(Continued)

OTHER PUBLICATIONS

Pub. No. 62218610 A, Japanese Patent Office & Japio Abstract, (Sep. 26, 1987, Hajime, et al.).

(Continued)

*Primary Examiner* — Lucas Stelling
(74) *Attorney, Agent, or Firm* — Christopher D. Hilker; David M. Shold

(57) ABSTRACT

A additive delivery system and method which includes a additive gel, a filter and a fluid/gel chemistry exchange region, wherein the exchange region subjects the additive gel to different types or combinations of contact with the fluid in order to control the additive release rate, maintain a uniform release rate, maintain the physical integrity of the gel or combinations thereof.

8 Claims, 11 Drawing Sheets

U.S. PATENT DOCUMENTS

| | | | |
|---|---|---|---|
| 7,000,655 | B2 | 2/2006 | Garvin et al. ............... 141/100 |
| 7,018,531 | B2 | 3/2006 | Eilers et al. ............... 210/205 |
| 2002/0014447 | A1 | 2/2002 | Rohrbach et al. |
| 2002/0195380 | A1 | 12/2002 | Martin et al. |
| 2002/0195384 | A1 | 12/2002 | Rohrbach et al. |
| 2003/0111398 | A1 | 6/2003 | Eilers et al. |
| 2005/0019236 | A1 | 1/2005 | Martin et al. |
| 2005/0040092 | A1 | 2/2005 | Eilers et al. |
| 2005/0150569 | A1 | 7/2005 | Garvin et al. |
| 2005/0173325 | A1 | 8/2005 | Klein et al. |
| 2005/0288192 | A1 | 12/2005 | Alexander et al. |
| 2006/0260874 | A1 | 11/2006 | Lockledge et al. |
| 2007/0004601 | A1 | 1/2007 | Mathur et al. |

FOREIGN PATENT DOCUMENTS

| | | |
|---|---|---|
| DE | 4201559 | 7/1993 |
| DE | 10242850 | 7/2003 |
| EP | 0254776 | 2/1988 |
| EP | 0416908 | 3/1991 |
| EP | 1061251 | 12/2000 |
| GB | 589079 | 6/1947 |
| WO | WO 02/058815 | 8/2002 |
| WO | WO 02/096534 | 12/2002 |
| WO | WO 2004/007653 | 1/2004 |
| WO | WO 2004/033063 | 4/2004 |
| WO | WO 2005123218 | 12/2005 |
| WO | WO 2007/024590 | 3/2007 |
| WO | WO 2007024590 | 3/2007 |

OTHER PUBLICATIONS

Pub. No. 57201510 A, Japanese Patent Office Abstract (Dec. 10, 1982, Shigenori et al.).

Pub. No. 11028318 A, Japanese Patent Office Abstract (Feb. 2, 1999, Hiromichi).

Search Report from corresponding international application No. PCT/US2008/0798 mailed 1/29/20009.

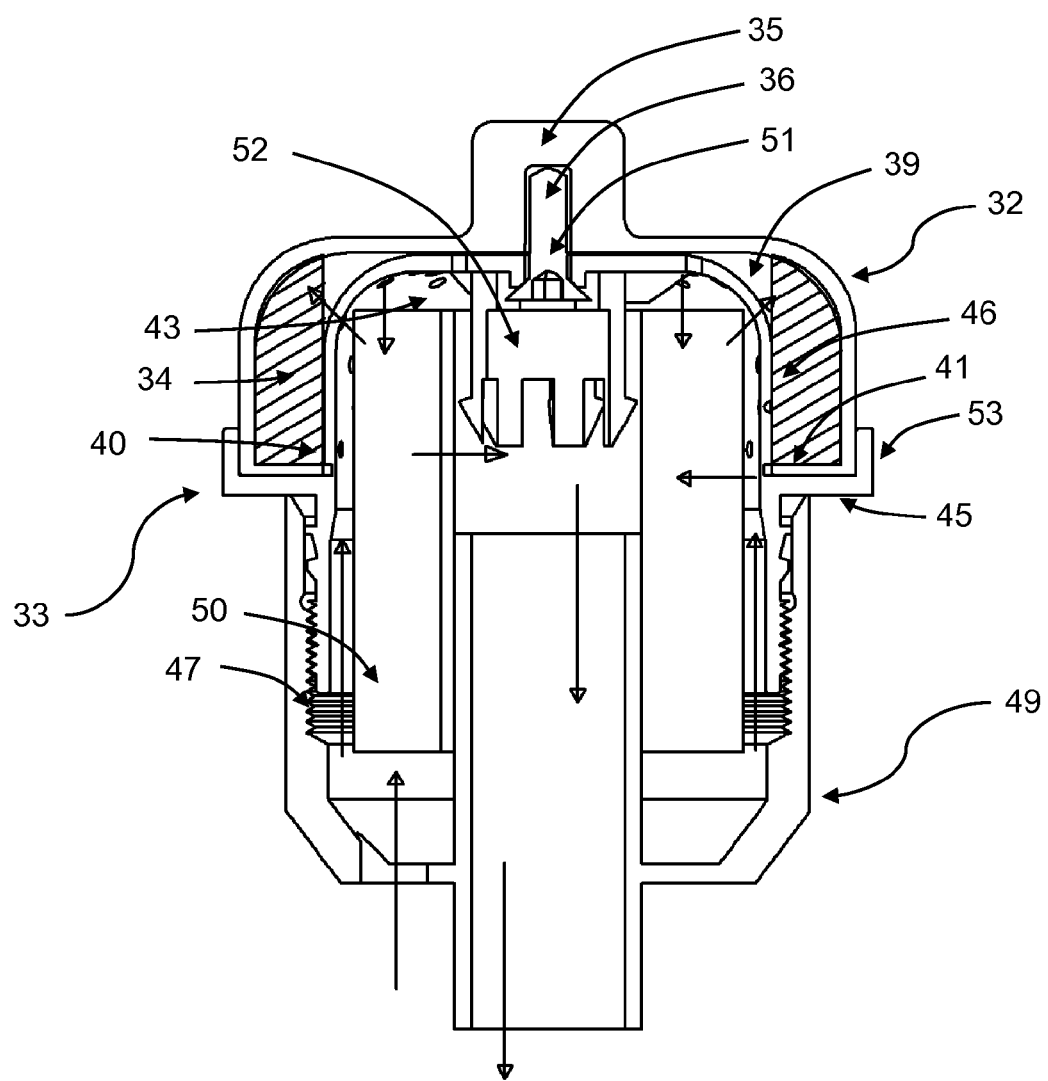

FILTER CAP ADDITIVE DELIVERY SYSTEM

This application is a divisional of prior application U.S. Ser. No. 11/875,022 filed 19 Oct. 2007 and claims benefit of said prior application.

FIELD OF THE INVENTION

The present invention relates to additive delivery systems for allowing a fluid, such as oil, to come into contact with an additive gel to cause one or more additive components in the gel to be slowly released into the fluid.

BACKGROUND OF THE INVENTION

Specially formulated slow-release additives that provide for the slow release of additives into a fluid such as oil to meet certain performance requirements of the fluid are generally known. In some, the additives are incorporated into thermoplastic polymers which slowly dissolve into the fluid. In others, the additives are incorporated into polymers which are oil-permeable at elevated temperatures. In still others, the additives are incorporated into particles which are fluid-insoluble but fluid-wettable. In still others, fluid soluble solid polymers are provided, with or without additional additives being incorporated into the polymers.

Although these slow-release additives are capable of introducing additives in the fluid being conditioned, it has been discovered that additive gels can be used more effectively to provide for the slow release of additives into a fluid, such as lubricant additives into oil. In particular, it has been found that fluid-soluble additive gels slowly dissolve to their component additive parts when contacted by the fluid. Examples of such additive gels are disclosed in U.S. Pat. No. 6,483,916, filed Jul. 16, 2002, U.S. patent application Ser. No. 10/603,644, filed Jun. 25, 2003, Ser. No. 10/603,894, filed Jun. 25, 2003 and Ser. No. 10/603,517, filed Jun. 25, 2003, which are incorporated herein by reference.

Garvin et al, U.S. Pat. No. 7,000,655, discloses an additive delivery system which includes a container for the additive gel wherein the container has one or more openings to allow contact of the fluid with the gel to cause one or more additive components in the gel to be released into the fluid and the container is located in a housing with a means of mounting the housing between the filter and the filter mounting surface.

Burrington et al, U.S. Pat. No. 6,843,916, discloses an oil filter comprising a housing, a filter for removing particulate matter from the oil passing through the filter, and oil-soluble lubricant additives inside the housing for slow release into the oil.

Although these additive delivery systems are capable of introducing additives into the fluid being conditioned, attaining a specific release rate of components while maintaining physical gel integrity is a critical feature for a practical controlled release gel system. Improper and/or non-uniform release rates may result in less than optimal performance of the fluid being conditioned and lack of physical gel integrity can result in particles of gel breaking off of the larger gel mass present in the controlled release system. These gel fragments are carried by the fluid and may plug filters and engine orifices, which may negatively impact the overall performance of the fluid-utilizing system or device.

Some applications have unique fluid flow characteristics through the fluid system, filter and any additive delivery system present. These fluid flow characteristics, which include fluid pressure, temperature and flow rate, can interfere with an additive delivery system, resulting in undesired or non-optimal additive release rates and a loss in gel integrity, leading to problems discussed above. Diesel passenger cars in particular tend to have oil system flow characteristics that interfere with existing additive delivery systems.

There is a need for additive delivery systems that allow for the desired contact of the fluid with these additive gels, to cause one or more components of the additives in the gels to be slowly released into the fluid, wherein the desired and/or uniform release rate of components is achieved while maintaining physical gel integrity. There is also a need for additive delivery systems that provides the desired controlled release of one or more additives in systems with various fluid flow characteristics, including those seen in the oil system of diesel passenger cars.

SUMMARY OF THE INVENTION

The present invention involves delivery systems for supplying one or more additives to a fluid by allowing the contact of a fluid with an additive gel, causing one or more components of the additives in the gel to be slowly released into the fluid, wherein the desired and/or uniform release rate of components is achieved while maintaining physical gel integrity.

In accordance with one aspect of the invention, the additive delivery system comprises an additive gel, a filter having a housing, and a fluid/gel chemistry exchange region located outside of the region of the filter housing that experiences the direct flow of the fluid where the fluid contacts the gel.

In accordance with another aspect of the invention, the exchange region of the system may allow for fluid/gel contacting comprising a) indirect fluid flow, b) direct fluid flow, or c) combinations thereof. The exchange region may be selected so as to control the release rate of additives from the additive gel into the fluid, to maintain a uniform release rate of additives, to maintain the physical integrity of the additive gel, or combinations thereof.

In accordance with another aspect of the invention, the system may comprise a filter gel cap that contains the gel, wherein the filter gel cap is mountable and removable from the crown of the filter housing, wherein the filter housing has one or more openings on the crown of the filter that allow fluid to pass from the filter, contact the additive gel and return to the filter. The number, size, shape, orientation, location, pattern, or combinations thereof of the openings on the crown of the filter housing may be selected so as to control and maintain the desired additive gel component release rate and additive gel physical integrity.

In accordance with another aspect of the invention, the cap of the filter housing may comprise an annular space along the outer wall of the filter cap housing, wherein the annular space is created by the outer wall of the filter cap housing body and an interior wall that forms a cylinder within the filter cap, wherein the interior wall connects to the outer wall on one end and is open on the other, and wherein the additive gel is placed within the annular space, whereby the fluid comes into contact with the additive gel in the filter by passing over the open end of the interior wall, contacting the additive gel in the annular space and passing back over the wall to the interior of the filter. The filter cap with the gel-containing annular space may have a mountable and removable lid that allows for direct access to the gel-containing annular space. The interior wall that forms the annular gel-containing space may contain one or more openings that allow fluid to pass from the filter housing into the annular space and contact the additive gel, and wherein the number, size, shape, orientation, location, pattern, or combinations thereof of the openings are utilized to control and maintain the desired additive gel component release rate and additive gel physical integrity.

In accordance with another aspect of the invention, the filter may be a cartridge filter that is mounted inside a canister type housing that has inlet and outlet passages for permitting fluid to flow through the housing and around the cartridge.

In accordance with another aspect of the invention, the delivery system may be used to condition the fluid in devices comprising internal combustion engines, natural gas engines, stationary engines, metal working coolant systems, industrial lubricated systems, oil or fuel filters, hydraulic systems, or transmission systems.

In accordance with another aspect of the invention, the filter may be an oil filter and the fluid may be engine lubricating oil, and the device utilizing the filter may be a diesel passenger car engine.

In accordance with another aspect of the invention, the system may be used as part of a method for releasing additives into a fluid comprising operating a device that utilizes a fluid.

In accordance with another aspect of the invention, the system can be the filter cap that contains a fluid additive gel, which can be mounted onto a fluid filter in such a way as to allow a fluid to pass between the filter and the cap, wherein the filter cap, when mounted onto said filter, contains a fluid/gel chemistry exchange region located outside the interior region of the filter that experiences the direct flow of the fluid, where the fluid contacts the gel.

BRIEF DESCRIPTION OF THE DRAWINGS

The present invention may be more readily understood by reference to the following drawings in which:

FIG. 4A is a schematic longitudinal section view through one form of additive delivery system of the present invention in an assembled state with fluid flow indicators.

DETAILED DESCRIPTION

Figure 1:
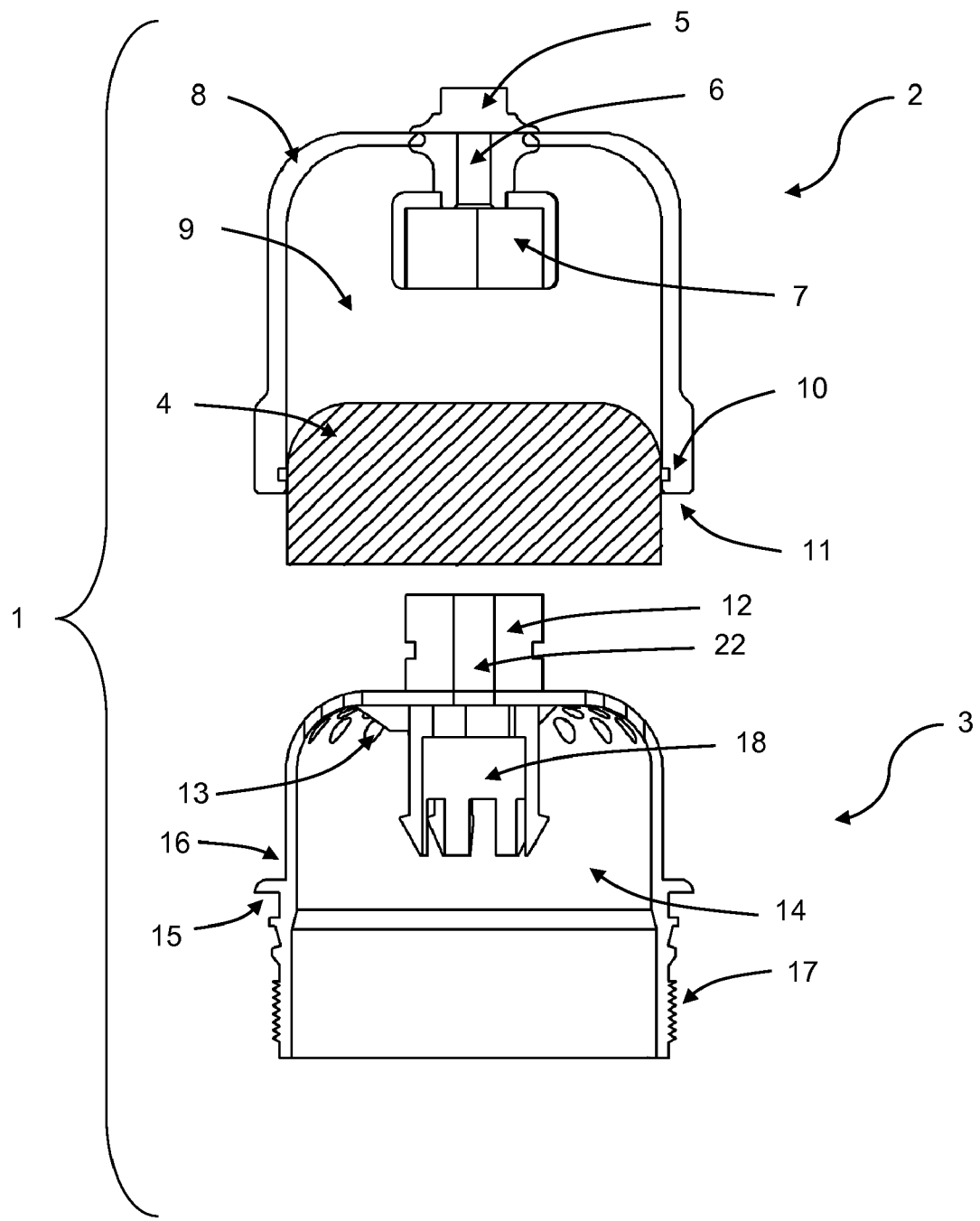
FIG. 1 is an exploded schematic longitudinal section view through one form of additive delivery system of the present invention including a filter additive gel cap and filter housing cap, where the additive gel is present in the filter gel cap, where the filter gel cap fastens to the filter housing cap, such that when the assembly is used in an operating system, the assembly allows for the fluid that passes through the filter to pass through the openings in the filter housing cap and come into contact with the additive gel inside the filter gel cap.

The additive delivery systems of the present invention provide for the desired contact of a fluid being conditioned with an additive gel to cause one or more components of the additives in the gel to be slowly released into the fluid as described hereafter wherein the desired and/or uniform release rate of the one or more components is achieved while maintaining the physical integrity of the additive gel. The additive delivery systems of the present invention can be used to condition the fluid in any lubricated mechanical systems or devices including but not limited to those in internal combustion engines, such as, but not limited to, diesel passenger car engines, natural gas engines, stationary engines, metal working coolant systems, industrial lubricated systems, oil or fuel filters, hydraulic systems and transmission systems and the like. The additive delivery system of the present invention provides the desired release rate and maintains gel integrity under various fluid flow characteristics in the fluid system and filter. These fluid flow characteristics include, but are not limited to, fluid pressure, temperature and flow rate. This improved performance, across applications with varying fluid flow characteristics in the applications' fluid system and filters, is achieved through the design of the additive delivery systems of the present invention.

In one embodiment of the additive delivery systems of the present invention the system comprises a fluid/gel chemistry exchange region where the gel and fluid come into contact with one another to allow for the release of additives from the additive gel into the fluid. The exchange region may allow for contact that subjects the additive gel to direct fluid flow, where direct fluid flow is fluid flow at the point of contact with the additive gel at the flow rate, direction, pressure, temperature, and the like, which is near or about the maximum value reached by the fluid in the filter for one or more of the parameters listed. The exchange region may allow for contact that subjects the additive gel to indirect fluid flow, where indirect fluid flow is fluid flow at the point of contact with the additive gel at a flow rate, direction, pressure, temperature, and the like, which is below the maximum value reached by the fluid in the filter for one or more of the parameters listed. Indirect flow regions may be created by placing the additive gel in a nearly enclosed region of the filter or outside the filter body as well as other means. The exchange region may also allow for combinations of these types of contact. This combination of exchange regions allows for the systems of the present invention to be customized to the additive release needs of the various applications, including applications with extreme or unusual flow characteristics in the filter.

In one embodiment the exchange region can experience less than full direct flow, that is some amount of indirect flow. In another embodiment the ratio of direct flow to indirect flow, by volume, in the exchange region can be between 5:95 and 95:5, between 10:90 and 90:10, or between 25:75 and 75:25. In another embodiment the ratio of direct flow to indirect flow, by volume, in the exchange region can be between 5:95 and 60:40, between 10:90 and 50:50, or between 15:85 and 45:55.

In one embodiment the additive delivery systems of the present invention contain the additive gel within a gel filter cap which attaches to the outer body of a filter whereby the additive gel is located outside of the filter housing and is not located in the direct flow areas of the fluid that passes through the filter. In one embodiment of the present invention, the filters used in the additive delivery systems of the present invention may be cartridge filters and the fluid may be lubricating oil.

Examples of additive gels which may be used with the present invention are disclosed in U.S. Pat. No. 6,483,916, filed Jul. 16, 2002, U.S. patent application Ser. No. 10/603,644, filed Jun. 25, 2003, Ser. No. 10/603,894, filed Jun. 25, 2003 and Ser. No. 10/603,517, filed Jun. 25, 2003, which are incorporated herein by reference.

Referring now in detail to the drawings, wherein the same reference numbers are used to designate like parts, and initially to FIG. 1, there is shown one form of a additive delivery system 1 in accordance with the present invention, including an additive gel filter cap 2 which may be mounted onto, and removed from, a filter housing cap 3 where the filter housing cap 3 connects to a filter body housing (not shown) which includes a filter media (not shown) to form a complete filter, such as an oil filter. The filter housing cap 3 is shown with external threading 17 along its bottom edge where the filter housing body would have internal threading and the filter housing cap 3 would fasten to the filter housing body by spinning the filter housing cap 3 so the external threads 17 interface with the internal threads of the filter housing body. The filter housing cap 3 may have a filter media fastening device 18 located on the inside surface opposite of the surface that mounts onto the filter using device. This fastening device may be in the form of a circular clip that is used to secure a filter media insert (not shown) in the filter housing cap. The filter media insert may connect to the filter housing cap 3 by snapping onto the fastening device 18 or by similar means. This type of removable and replaceable filter media insert is commonly used in cartridge type filters. The filter housing cap 3 may also be part of a complete, single piece filter (not shown), where the filter housing cap cannot be separated from the rest of the filter housing, but is a single piece.

The additive gel filter cap 2 may include a bolt head 5 on the crown of the additive gel filter cap 2, such as a hex bolt head, to allow for tools, such as wrenches, to interface with the gel filter cap 2. The filter housing cap 3 may also include a bolt head 12 on the crown of the filter housing cap, such as a hex bolt head.

The additive gel filter cap 2 may include a bolt head socket 7, located on the inside surface of the additive gel filter cap 2 opposite of the end with the mounting surface for the filter using device, which rests on and interfaces with the filter housing cap 3 when the gel filter cap 2 is mounted on the filter housing cap 3. More specifically, the bolt head socket 7 of the additive gel filter cap 2, may interface with the bolt head 12 of the filter housing cap 3, creating an interface that allows the effect of tools on the bolt head of the additive gel filter cap 5 to be transferred to the bolt head 12 of the filter housing cap 3. For example, where the bolt head on the crown of a filter is utilized to install the filter onto a larger device, such as an internal combustion engine, the interface created by the additive gel filter cap's bolt head socket 7 allows the bolt head on the additive gel filter cap to be utilized in the same manner for the filter installation.

The additive gel filter cap 2 contains the additive gel 4 in the interior void space 9 of the additive gel filter cap 2 between and around the bolt head socket 7 and the side wall 8 of the additive gel filter cap 2, as shown in FIG. 1. The additive gel 4 may be placed in the interior void space 9 prior to the additive gel filter cap 2 being mounted onto the filter housing cap 3. The additive gel 4 may be dispensed into the interior void space 9 whereby the components of the gel may be mixed within the space such that the gel formation/manufacturing occurs within the additive gel filter cap 2, or the additive gel 4 may be pre-formed into a shape or shapes that allows the gel to be inserted into the interior void space 9 of the additive gel filter cap 2. The additive gel 4 may be further contained in one or more gel containers, packages or gel cups (not shown) that may be inserted into the interior void space 9 of the additive gel filter cap 2. The gel cup or cups, or other containers, may be removable, allowing the gel cup to be removed and replaced or refilled with gel, and placed in another additive gel filter cap 2 for additional use. A removable gel cup may also allow a used filter to be serviced, either after removal from the apparatus or device it is used with or while still connected to such an apparatus or device, by removing the additive gel filter cap 2 from the filter housing cap 3 and then removing the used gel cup and replacing it with a new gel cup with a new supply of additive gel 4. The gel cup may have openings of various sizes and shapes to allow for the contact of the fluid with the additive gel 4 present in the gel cup.

The filter housing cap 3 may be a standard filter housing cap used with a filter housing body and filter media to form a conventional filter where modifications are made after the initial filter manufacturing in order to make the filter housing cap 3 compatible with the additive gel filter cap 2. The filter housing cap 3 may also be specially designed to work with an additive gel filter cap 2. The filter housing cap 3 may have one or more openings 13 located on the crown of the housing cap that allow for fluid, when a filter gel cap 2 is mounted onto the housing cap 3, to pass from the interior of the filter cap 14, through the openings 13 in the filter housing cap 3 and into the additive gel filter cap's interior void space 9, where the fluid comes into contact with the additive gel 4, and then passes through the openings 13 in the filter housing cap 3 and back into the interior of the filter cap 14 and the rest of the filter (not shown).

The filter housing cap openings 13 may be one or more circular holes, as shown in FIG. 1, that allow for fluid to travel across the filter housing cap 3. The housing cap openings 13 may be of various sizes and shapes, including but not limited to circles, ovals, slits or mixtures thereof and may be arranged symmetrically or randomly on the filter housing cap 3. The openings 13 may also be so large as to effectively encompass the entire crown of the filter cap, leaving only the filter media insert support 18 and some means connecting the support 18 to a remaining rim of the filter housing cap 3 where the rim may include the housing cap's side exterior wall 16 and everything below it. The openings 13 may be arranged such that the axis passing through the center of the openings are parallel to the vertical axis of the filter housing cap 3. The openings 13 may be also be arranged such that the axis passing through the center of the openings are at an angle to the vertical axis of the filter housing cap 3. The openings 13 may be part of the filter design and fabrication or the openings 13 may be created after the filter is manufactured.

The flow characteristic of the fluid as it contacts the additive gel 4 can be controlled and by modifying the orientation, size, shape, arrangement, location and combinations thereof of the openings 13 in the filter housing cap 3. Modifying one or more of these parameters related to the housing cap's openings 13 modifies the amount of surface area of the additive gel 4 contacted by the fluid passing through the additive gel filter cap 2; modifies the flow rate, flow direction, fluid pressure and other fluid flow characteristics of the fluid passing through the additive gel filter cap 2; or combinations thereof. This control of fluid flow characteristic allows for the additive delivery systems of the present invention to provide the desired additive gel component release rate while maintaining additive gel integrity in a wide variety of applications.

In addition, the inner surface of the additive gel filter cap's side wall 8 may have an undercut, grade, reduction or similar geometric feature to create a flow path for the fluid around the additive gel 4 and/or to help keep the additive gel 4 secure and intact within the void space 9 of the additive gel filter cap 2.

The additive gel filter cap 2 mounts onto the filter housing cap 3 whereby the additive gel filter cap 2 slides over filter housing cap 3 such that the bottom edge 11 of the side wall 8 of the additive gel filter cap 2 rests in an outer lip 15 that runs around the outside of the filter housing cap 3 below all of the openings 13 in the filter housing cap 3 and above the external threads 17 of the filter housing cap 3. The additive gel filter cap 2 may also include a seal cavity 10 which may be in the form of a annular space carved out of the lower inside surface of the side wall 8, forming a ring cavity that allows for the use of an o-ring or similar seal (not shown) in the seal cavity 10. The use of a seal in the seal cavity 10 can act to provide a seal between the additive gel filter cap 2 and the filter housing cap 3 where the seal in the seal cavity 10 contacts the filter housing cap exterior wall surface 16 when the additive gel filter cap 2 is mounted on the filter housing cap 3.

The additive gel filter cap 2 may also be secured to the filter housing cap 3 by means of a bolt or similar fastening device. The bolt, or similar device, may be placed through the center of the filter housing cap 3 through a hollow shaft 22 in the bolt head 12 on the crown of the housing cap 3. The bolt may then interface with threads on the walls of a similar shaft 6 in the center of the additive gel cap 2 thereby fastening the additive gel cap 2 onto the filter housing cap 3.

Figure 1A:
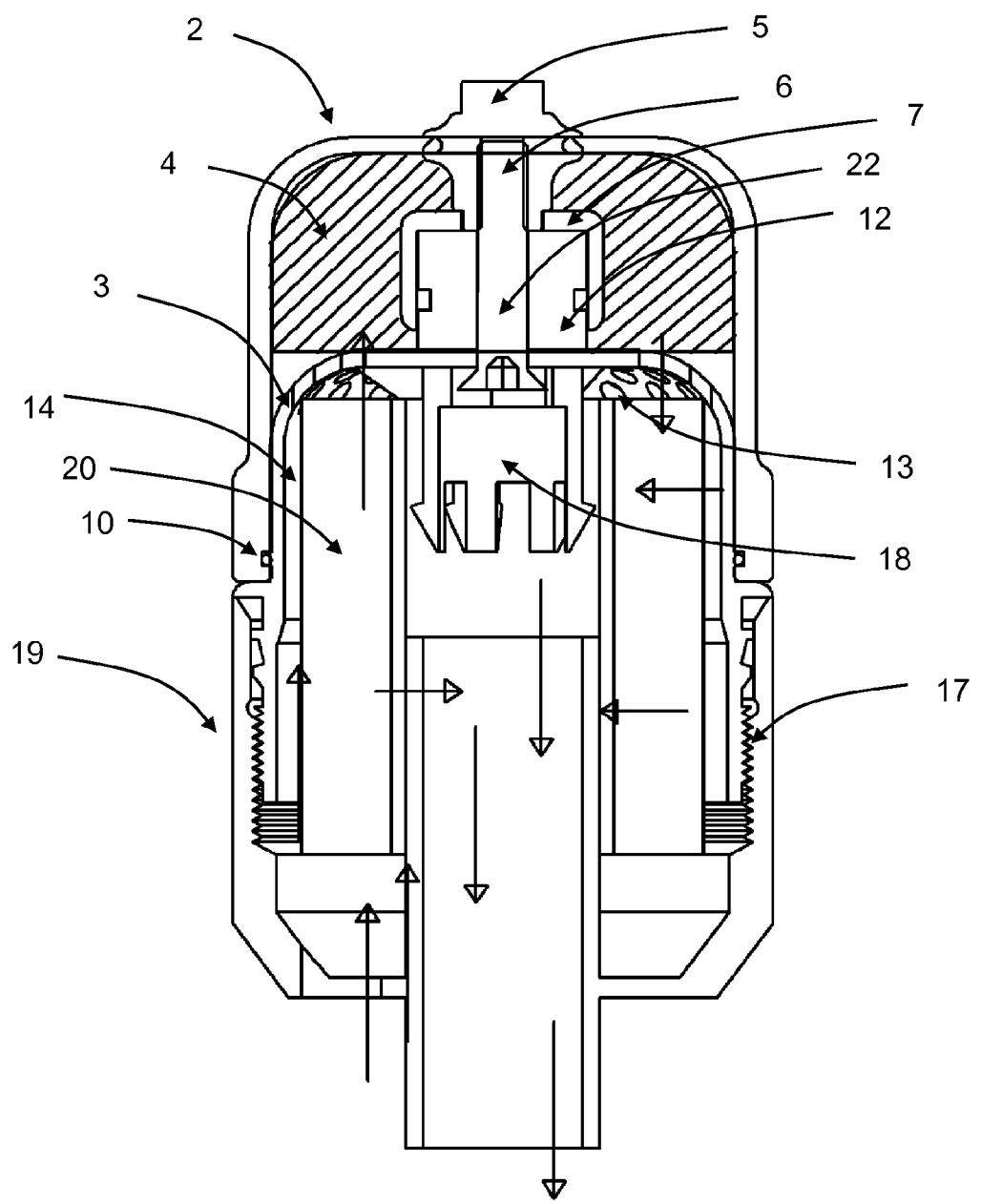
FIG. 1A is a schematic longitudinal section view through one form of additive delivery system of the present invention in an assembled state with fluid flow indicators.
Figure 1B:
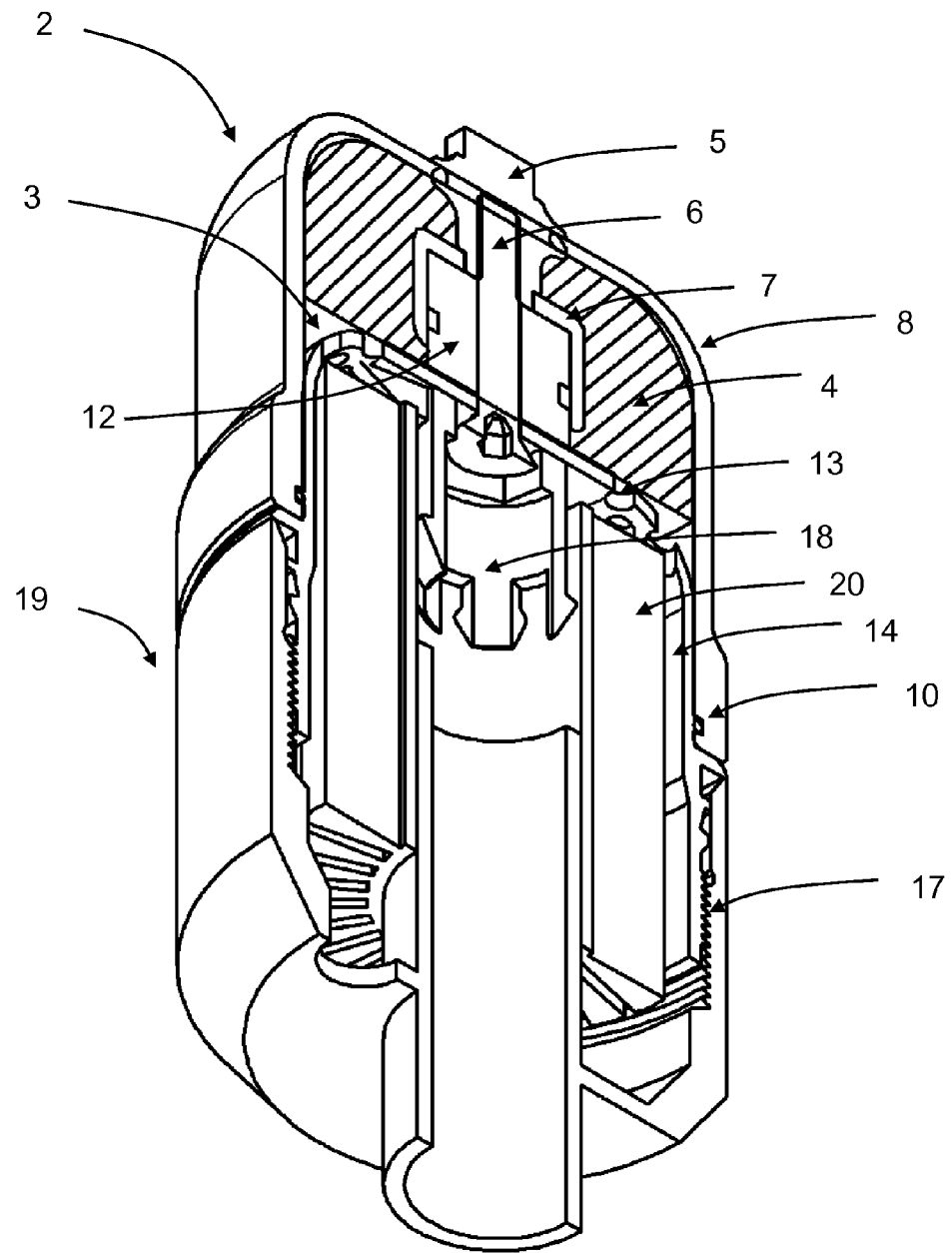
FIG. 1B is a perspective view of one embodiment of the additive delivery system of the present invention in an assembled state.

FIG. 1A shows a cross section diagram of the present invention where the additive gel filter cap 2 and the filter housing cap 3 are in an assembled state, where the additive gel filter cap 2 is mounted on crown of the filter housing cap 3 and the arrows indicate the flow of the fluid being conditioned through the system. The filter body housing 19 and the filter media 20 are also shown. FIG. 1B shows an exploded perspective view of the present invention. The same labels are used to identify the various features of the embodiments shown in FIGS. 1, 1A and 1B, unless otherwise noted.

In FIG. 1A the arrows indicate how the fluid from the device with which the filter is being used may flow within the filter, and more specifically how the fluid may flow within the filter housing cap 3, pass through the openings 13 in the filter housing cap 3 and into the additive gel filter cap 2 where the fluid comes into contact with the additive gel 4 and then passes back through the openings 13 in the filter housing cap 3, into the filter housing cap 3 and back to the device as filtered and conditioned fluid.

The fluid flowing through the filter housing body 19 will pass through a filter element 20 which may be fabricated of any suitable filtering medium and will return the fluid to the device. The fluid, as shown in FIG. 1A, will also pass into the additive gel filter cap 2 where the fluid will come into contact with the additive gel 4 and then return to the filter housing cap 3 and the filter housing 19. This controlled flow of fluid across the additive gel 4 results in a controlled dissolution of the additive components of the additive gel 4 into the fluid while maintaining the physical integrity of the additive gel 4. The present invention allows gels of various formulations, including relatively soft gels that would otherwise: 1) release additive components too quickly, 2) release additive components at non-uniform rates, 3) completely dissolve before the end of a desired service cycle, 4) be broken up into gel fragments that would be carried by the fluid and potentially block device lines and orifices, or 5) combination thereof, to be used more effectively and in a wider range of applications without these issues.

Figure 2:
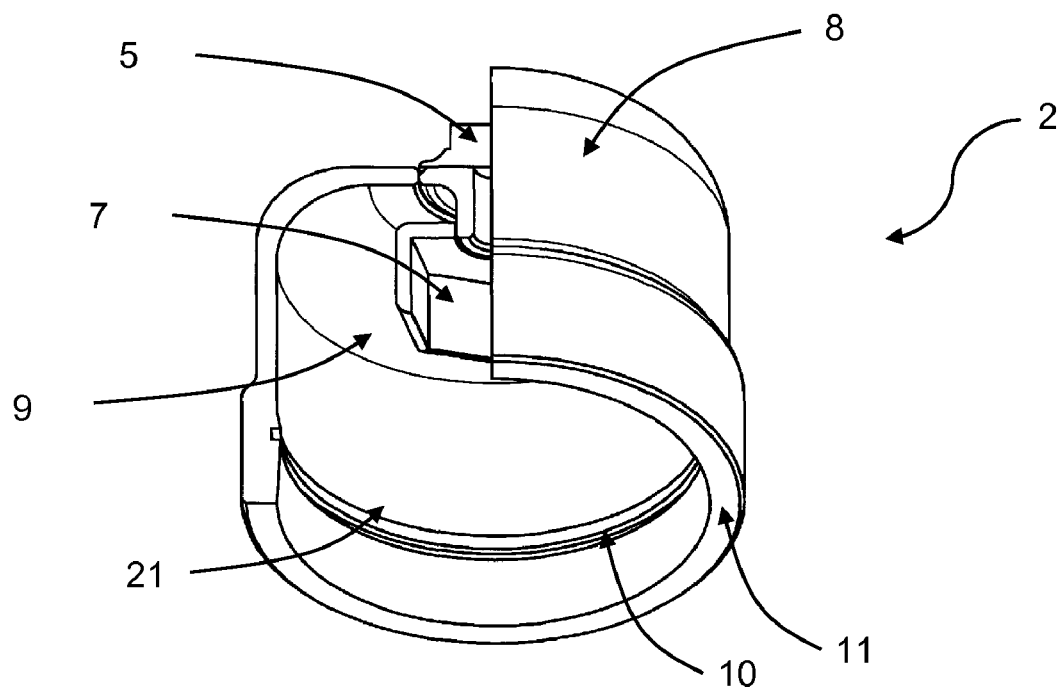
FIG. 2 is a sectional perspective view of one embodiment of the filter additive gel cap without the additive gel shown.
Figure 3:
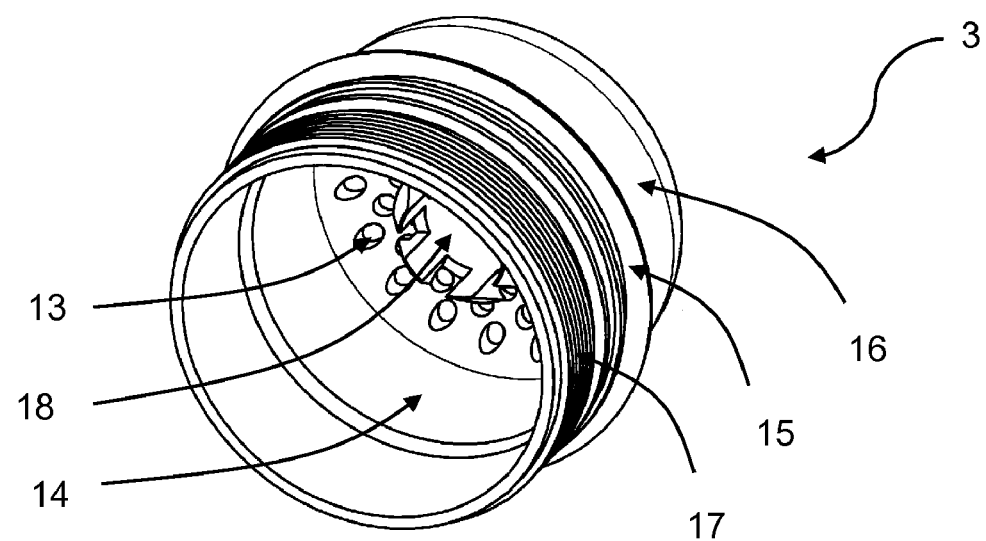
FIG. 3 is a sectional perspective view of one embodiment of the filter housing cap for use with the filter additive gel cap.

FIG. 2 is a sectional perspective view of one embodiment of the filter additive gel cap where no additive gel is present and FIG. 3 is a perspective view of one embodiment of the filter housing cap. The identifying features of the embodiments shown in FIG. 2 and FIG. 3 are similar to those described in FIG. 1, FIG. 1A and FIG. 1B and are identified by the same labels.

Figure 4:
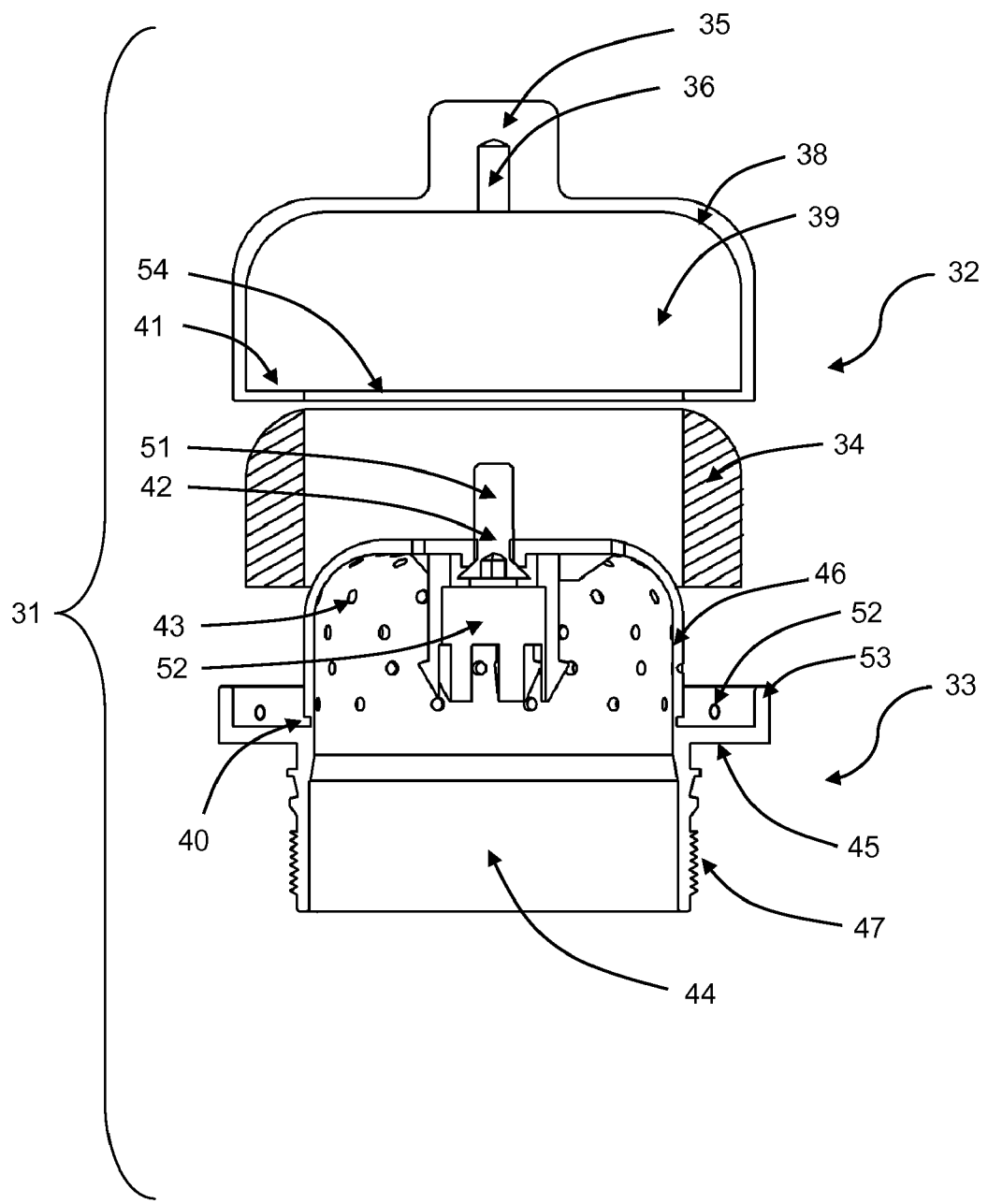
FIG. 4 is an exploded schematic longitudinal section view through one form of additive delivery system of the present invention including a filter additive gel cap and filter housing cap, where the additive gel is present in the filter gel cap, where the filter gel cap fastens to the filter housing cap, such that when the assembly is used in an operating system, the assembly allows for the fluid that passes through the filter to pass through the openings in the filter housing cap and come into contact with the additive gel.

Another embodiment of the present invention is shown in FIG. 4, where the additive delivery system 31 includes an additive gel filter cap 32 which may be mounted onto a filter housing cap 33 where the filter housing cap 33 connects to a filter body housing (not shown) to form a complete filter, such as but not limited to an oil filter. While FIG. 4 shows one embodiment of the present invention and FIG. 1 shows another embodiment, many of the same features are present in both, and where a given feature is present in both embodiments, the description provided above in regards to FIG. 1 also applies to the embodiment shown in FIG. 4 unless otherwise noted.

The filter housing cap 33 in FIG. 4 is shown with external threading 47 along its bottom edge where the filter housing body (not shown) would have internal threading and the filter housing cap 33 would fasten to the filter housing body (not shown) by spinning the filter housing cap 33 so the external threads 47 interface with the internal threads of the filter housing body (not shown). The filter housing cap 33 may have a filter media insert fastening device 52 similar to the media fastening device 18 in FIG. 1 that allows filter media inserts to connect to the filter housing cap 33.

Similar to the embodiment of the present invention shown in FIG. 1, the embodiment of the present invention may include a bolt head (not shown) on the crown of the filter housing cap 33. The present invention may also include, as shown in FIG. 4, an opening 42 on the crown of the filter housing cap 33 where the opening 42 allows for a bolt 51 or similar device to be used to secure the additive gel filter cap 32 to the filter housing cap 33 by allowing the bolt 51 to pass through the opening 42 on the crown of the filter housing cap and into a shaft 36 in the additive gel filter cap 32. The shaft 36 may have threads that interface with the bolt 51, thus securing the additive gel filter cap 32 to the filter housing cap 33. The filter additive gel cap 32 may also include a bolt head 35 on the crown of the filter housing cap, such as a hex bolt head or square bolt head.

The additive gel filter cap 32 may include a bolt head socket (not shown), located inside the additive gel filter cap 32, which rests on and interfaces with the filter housing cap 33. More specifically, the bolt head socket (not shown) of the additive gel filter cap 32, may interface with a bolt head socket (not shown) of the filter housing cap 33 or may rest on the crown of the filter housing cap 33.

The additive gel filter cap 32 contains the additive gel 34 in the interior void space 39 of the additive gel filter cap 32 between and around any bolt head socket (not shown) and the side walls 38 of the additive gel filter cap 32, as shown in FIG. 4. The additive gel 34 may be placed in the additive gel filter cap's interior void space 39 in the same manners described above in regards to the embodiment of the invention shown in FIG. 1.

The filter housing cap 33 may be a standard filter housing cap used with modifications made after the initial filter manufacturing in order to make the filter housing cap 33 compatible with the additive gel filter cap 32. The filter housing cap 33 may also be specially designed to work with an additive gel filter cap 32. The filter housing cap 33 may have one or more openings 43 located on the crown of the filter housing cap 33 that allow for fluid, when the cap is assembled as a filter with an additive gel filter cap 32, to pass from the interior of the filter housing cap 44, through the openings 43 in the filter housing cap 33 and into the additive gel filter cap's interior void space 39, where the fluid comes into contact with the additive gel 34, and then passes through the openings 43 in the filter housing cap 33 and back into the interior of the filter housing cap 44 and the rest of the filter (not shown).

The filter housing cap openings 43 may be varied in the same ways described above in regards to the embodiment of the invention shown in FIG. 1, and more specifically, in regards to the openings 13 in the filter housing cap 3 shown in FIG. 1. Varying the parameters related to the openings 43 has the same impact as described above, specifically controlling the flow characteristics of the fluid as it contacts the additive gel 34. This control of fluid flow characteristic allows for the additive delivery systems of the present invention to provide the desired additive gel component release rate while maintaining additive gel integrity in a wide variety of applications.

The additive gel filter cap 32 mounts onto the filter housing cap 33 whereby the additive gel filter cap 32 slides over the filter housing cap 33 such that the bottom edge 41 of the side wall 38 of the additive gel filter cap 32 rests in an outer lip 45 that runs around the outside of the filter housing cap 33 below all of the openings 43 in the filter housing cap 33 and above the external threads 47 of the filter housing cap 33.

The filter housing cap's outer lip 45 may have an outer wall 53 that creates a wall around the outer edge of the lip 45. This outer wall may create a circular well between the filter housing cap lip 45, the filter housing cap exterior wall surface 46, and the lip's outer wall 53, in which the bottom edge 41 of the additive gel filter cap 32 sits when the additive gel filter cap 32 is mounted to the filter housing cap 33.

The outer wall 53 may have one or more openings 52 that allow for the use of one or more screws, pins or other similar items (not shown), where the screws of other similar items are used to further secure the additive gel filter cap 32 to the filter housing cap 33. This securing is accomplished wherein the additive gel filter cap 32 is mounted on the filter housing cap 33 such that the bottom surface 41 of the additive gel filter cap 32 is resting on the outer lip 45 of the filter housing cap, set screws, or other similar items, can be inserted in the openings 52 in the lip's outer wall 53 such that the screws are secured to the wall 53 and press against the additive gel filter cap's outer side walls 38, causing the inner surface of the ring 54 created by the bottom surface 41 of the additive gel filter cap 32 to be pressed against the outer wall 46 of the filter housing cap 33, and thereby holding the additive filter cap 32 in place.

The filter housing cap 33 may also have a sealing cavity or groove 40 around its circumference where the sealing groove 40 may be located in the exterior surface 46 of the filter housing cap 33 just above the housing cap's outer lip 45. The sealing groove 40 may also act to further secure the additive gel filter cap 32 to the filter housing cap 33 where, when the additive gel filter cap 32 is being mounted onto the filter housing cap 33, the ring-like inside surface 54 of additive gel filter cap 32, created by the gel cap's bottom surface 41, slides down along the filter housing cap's outer wall 46 and is inserted in the sealing groove 40 of the filter housing cap 40. If sized appropriately, the additive gel filter cap 32 and the filter housing cap 33 would snap together with the gel cap's inside ring surface 54 locking into the filter housing cap's sealing groove 40. The sealing groove 40 may also contain an o-ring or similar sealing device (not shown) to form a seal between the filter housing cap 33 and the gel cap 32.

Figure 4B:
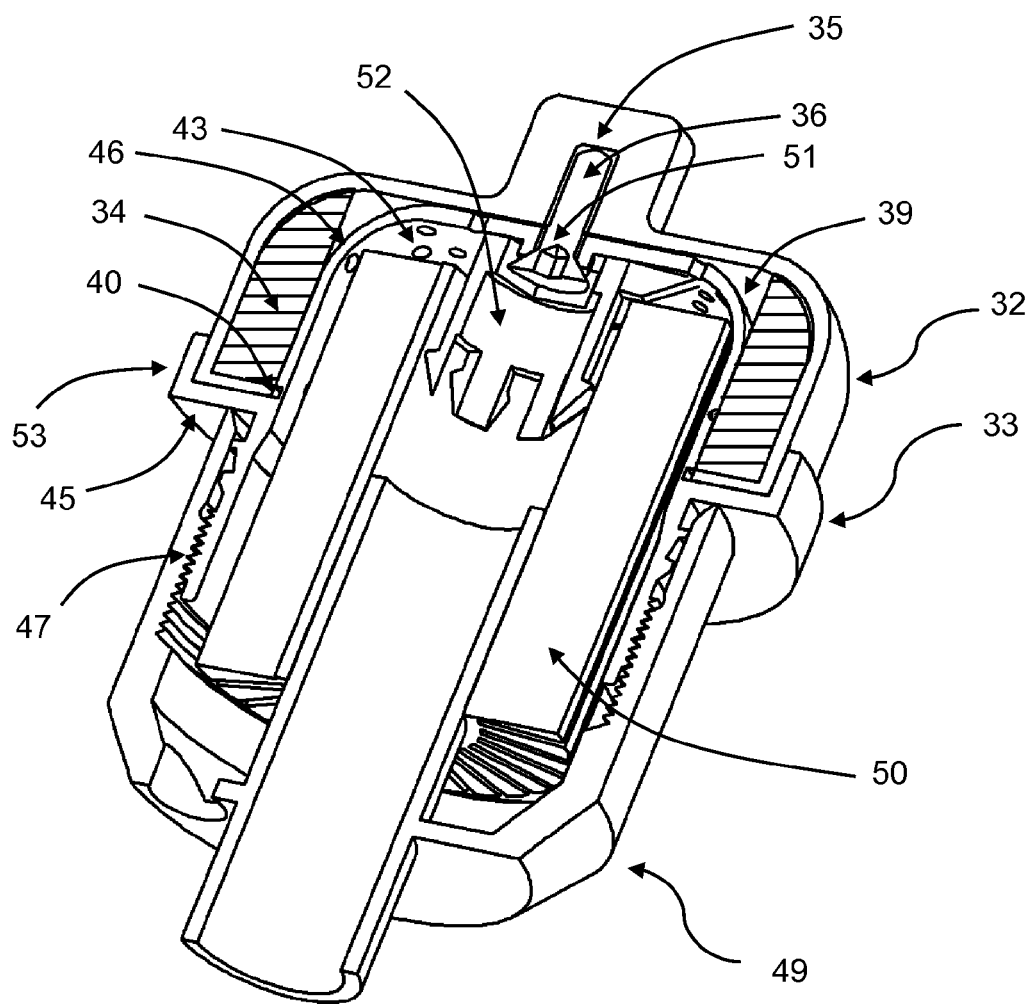
FIG. 4B is a perspective view of one embodiment of the additive delivery system of the present invention in an assembled state.

FIG. 4A shows a cross section diagram of the present invention where the additive gel filter cap 32 and the filter housing cap 33 are in an assembled state, where the additive gel filter cap 32 is mounted on the crown of the filter housing cap 33 and the arrows indicate the flow of the fluid being conditioned through the system. The filter body housing 49 and filter media 50 are also shown. FIG. 4B shows a perspective view of the present invention. The same labels are used to identify the various features of the embodiments shown in FIGS. 4, 4A and 4B, unless otherwise noted.

In FIG. 4A the arrows indicate how the fluid from the device with which the filter is being used may flow within the filter, and more specifically within the filter housing cap 33, pass through the openings 43 in the filter housing cap 33 and into the additive gel filter cap 32 where the fluid comes into contact with the additive gel 34 and then passes back through the openings 43 in the filter housing cap 33, into the filter housing cap 33 and back to the device as filtered and conditioned fluid.

The fluid flowing through the filter housing body 49 will pass through a filter element 50 which may be fabricated of any suitable filtering medium and will return the fluid to the device. The fluid, as shown in FIG. 4A, will also pass into the additive gel filter cap 32 where the fluid will come into contact with the additive gel 34 and then return to the filter housing. This indirect flow of fluid across the additive gel 34 located in the additive gel filter cap 32 results in the controlled dissolution of the additive components of the additive gel 34 into the fluid while maintaining the physical integrity of the additive gel.

Figure 5:
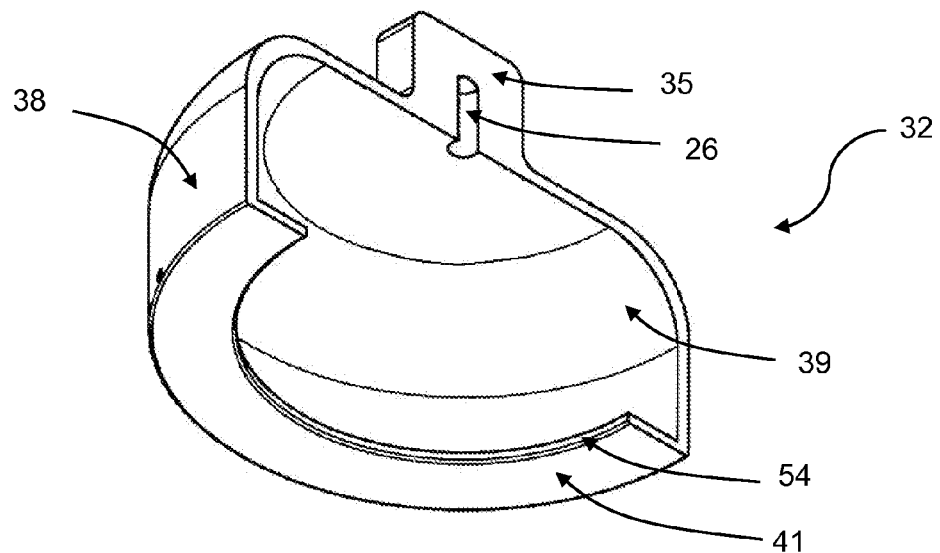
FIG. 5 is a sectional perspective view of one embodiment of the filter additive gel cap without the additive gel shown.
Figure 6:
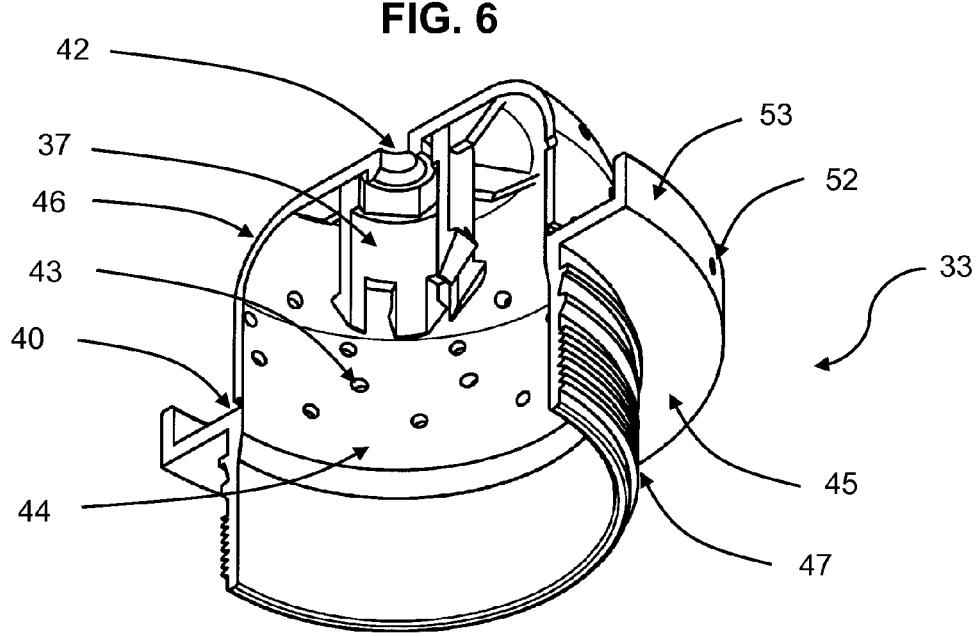
FIG. 6 is a sectional perspective view of one embodiment of the filter housing cap for use with the filter additive gel cap.

FIG. 5 is a sectional perspective view of one embodiment of the filter additive gel cap without gel present and FIG. 6 is a sectional perspective view of one embodiment of the filter housing cap. The identifying features of the embodiments shown in FIG. 5 and FIG. 6 are similar to those described in FIG. 4, FIG. 4A and FIG. 4B and are identified by the same labels.

Figure 7:
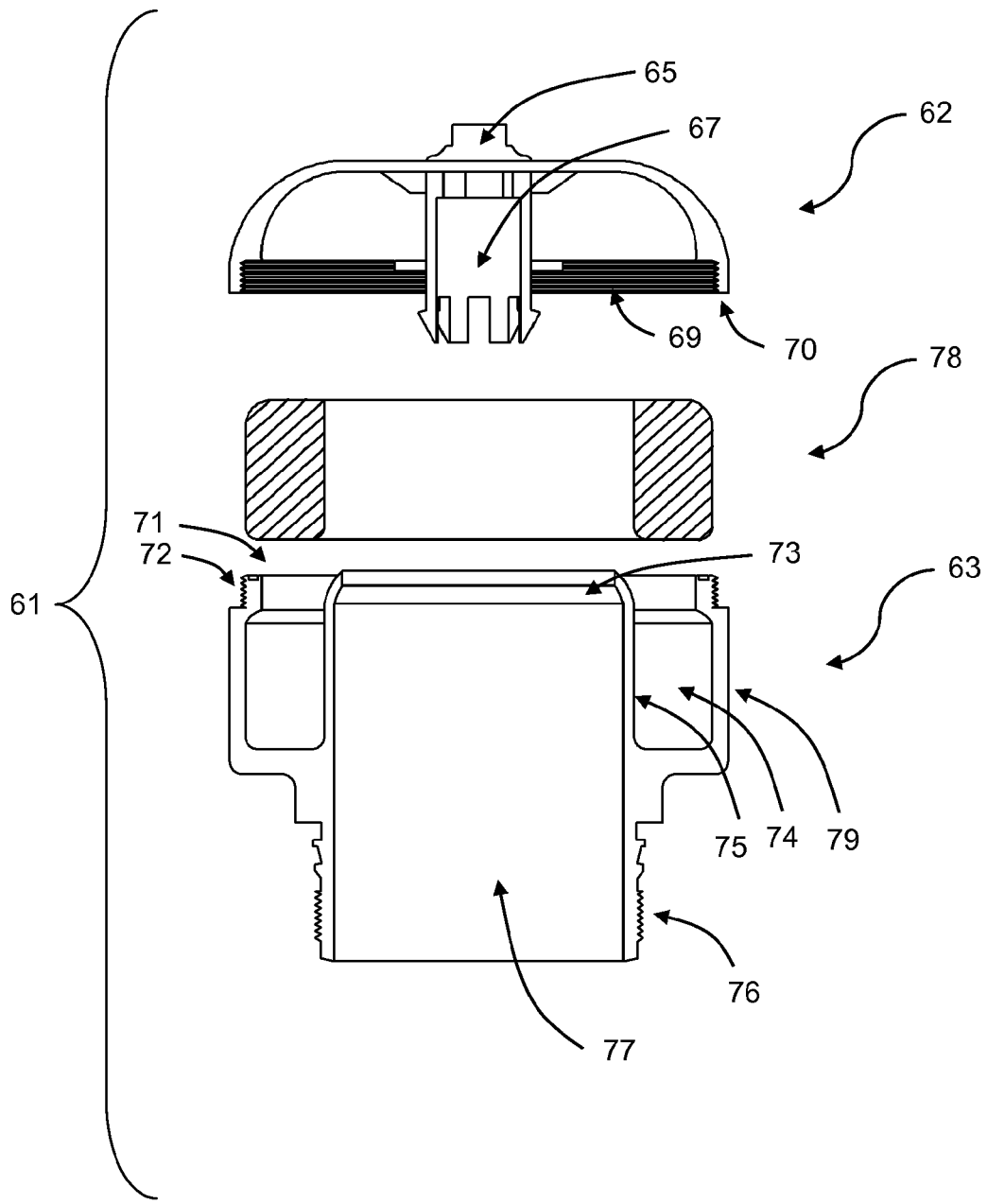
FIG. 7 is an exploded schematic longitudinal section view through one form of additive delivery system of the present invention including a combination filter additive gel cap and filter housing cap, where the additive gel is present in the combination filter additive gel cap and filter housing cap in an annular space, where the combination filter additive gel cap and filter housing cap comprises two parts, a body part and a lid part, where the lid can be removed to allow for more convenient insertion of the additive gel into the annular space, such that when the assembly is used in an operating system, the assembly allows for the fluid that passes through the filter to come into contact with the additive gel.

Another embodiment of the present invention is shown in FIG. 7, where the additive delivery system 61 includes an additive gel filter cap which may be an integrated part of a filter housing cap. In this embodiment, the filter housing cap and filter cap are in the form of an integrated part that contains the additive gel 78 and connects to the filter body housing (not shown) to form a filter.

While FIG. 7 shows one embodiment of the present invention and FIG. 1 and FIG. 4 show other embodiments, many of the same features are present all of the figures and where a given feature is present in more than one embodiment, the descriptions provided above in regards to the embodiments shown in FIG. 1 and FIG. 4 also apply to the embodiment shown in FIG. 7 unless otherwise noted.

The integrated filter gel cap 61 of the present invention may be a single piece that attaches to a filter body housing (not shown) just as a conventional filter housing cap would, utilizing interlocking threads or a similar fastening means. The integrated filter gel cap 61 of the present invention may also be made up of two distinct parts, a lid 62 and a body 63 where the lid 62 may be removed from the body 63 to allow for better access to the annular space 74 that holds the additive gel 78. The lid 62 may have internal threading 69 on the inside of its bottom edge 70 used to connect it to the body 63. The body 63 may have external threading 72 on the outside of its upper edge 71 used to connect the body 63 to the lid 62. The lid 62 and the body 63 may be connected by placing the threads, 69 and 72, in contact with one another and spinning the lid 62 to engage the threads into one another.

The integrated gel filter cap body 63 in FIG. 7 is shown with external threading 76 along its bottom edge where the filter housing body (not shown) would have internal threading and the integrated gel filter cap body 63 would fasten to the filter housing body (not shown) by spinning the integrated gel filter cap body 63 so the external threads 76 interface with the internal threads of the filter housing body (not shown).

The integrated gel filter cap lid 62 may have a filter media insert fastening device 67 similar to the media fastening device 18 in FIG. 1 that allows filter media inserts to connect to the integrated gel filter cap lid 62.

Similar to the embodiment of the present invention shown in FIG. 1, the embodiment of the present invention shown in FIG. 7 may include a bolt head 65 on the crown of the integrated gel filter cap lid 62.

The integrated gel filter cap 61 contains the additive gel 78 in the interior annular void space 74 of the integrated gel filter cap body 63 between the integrated gel filter cap body's outer wall 79 and its inner wall 75. This annular space 74 can be adjusted to hold various amounts of additive gel 78 based on the dimensions of the integrated gel filter cap 61 and specifically the integrated gel filter cap body 63. The additive gel 78 may be placed in the integrated gel filter cap's interior annular void space 74 in the same manners described above in regards to the embodiment shown in FIG. 1. The ability to remove the integrated gel filter cap lid 62 from the integrated gel filter cap body 63 allows for additional options of inserting the additive gel 78.

The integrated gel filter cap body's interior wall 75 may have an inward curve that acts as a diverter edge or similar feature at its upper edge 73 as shown in FIG. 7. This diverter edge 73 acts to affect the flow characteristics present in a filter when it is fully assembled with the integrated filter gel cap 61. Specifically, the geometry of the integrated gel filter cap's body's internal wall 75 and its diverter edge 73 can affect the amount of contact between the additive gel 78 and the fluid passing through the filter (not shown) as well as the flow rate, direction of flow relative to the additive gel 78 and pressure of the fluid during the contact. The integrated gel filter cap's body's internal wall 75 may also have one or more openings (not shown) located along the wall between the interior void space 77 that encloses the filter media insert (not shown) and the annular space 74 that contains the additive gel 78. These openings (not shown) may allow for fluid, when the integrated cap is assembled and used as a filter, to pass from the interior of the filter cap 77, through the openings in the integrated gel cap body's interior wall 75 and contact the additive gel 78 contained in the annular space 74. The fluid may contact the additive gel 78 at the openings and remain within the interior of the filter housing 77 or it may pass through the openings into the annular space 74, contacting the additive gel 78 during this period, and travel up to the interior wall's upper edge 73, where the fluid then returns to the interior space of the filter housing 77 and continues to pass through the filter.

The integrated gel filter cap interior wall openings (not shown) may be one or more circular holes, and may also be of various sizes and shapes, including but not limited to circles, ovals, slits or mixtures thereof and may be arranged symmetrically or randomly on the integrated gel filter cap's interior wall 75. The openings may be arranged such that the axis passing through the center of the openings are perpendicular to the plane of the interior wall 75. The openings may be also be arranged such that the axis passing through the center of the openings are at an angle to the plane of the interior wall 75.

The flow characteristic of the fluid as it contacts the additive gel 78 can be controlled and by modifying the orientation, size, shape, arrangement, location and combinations thereof of the openings in the integrated gel filter cap body 63 and/or by modifying the geometry of the integrated gel filter cap's interior wall 75 and upper edge 73. Modifying one or more of these parameters modifies the amount of surface area of the additive gel 78 contacted by the fluid passing through the integrated gel filter cap 61; modifies the flow rate, flow direction, fluid pressure and other fluid flow characteristics of the fluid passing through the integrated gel filter cap 61; or combinations thereof. This control of fluid flow characteristic allows for the additive delivery systems of the present invention to provide the desired additive gel component release rate while maintaining additive gel integrity in a wide variety of applications.

Figure 7A:
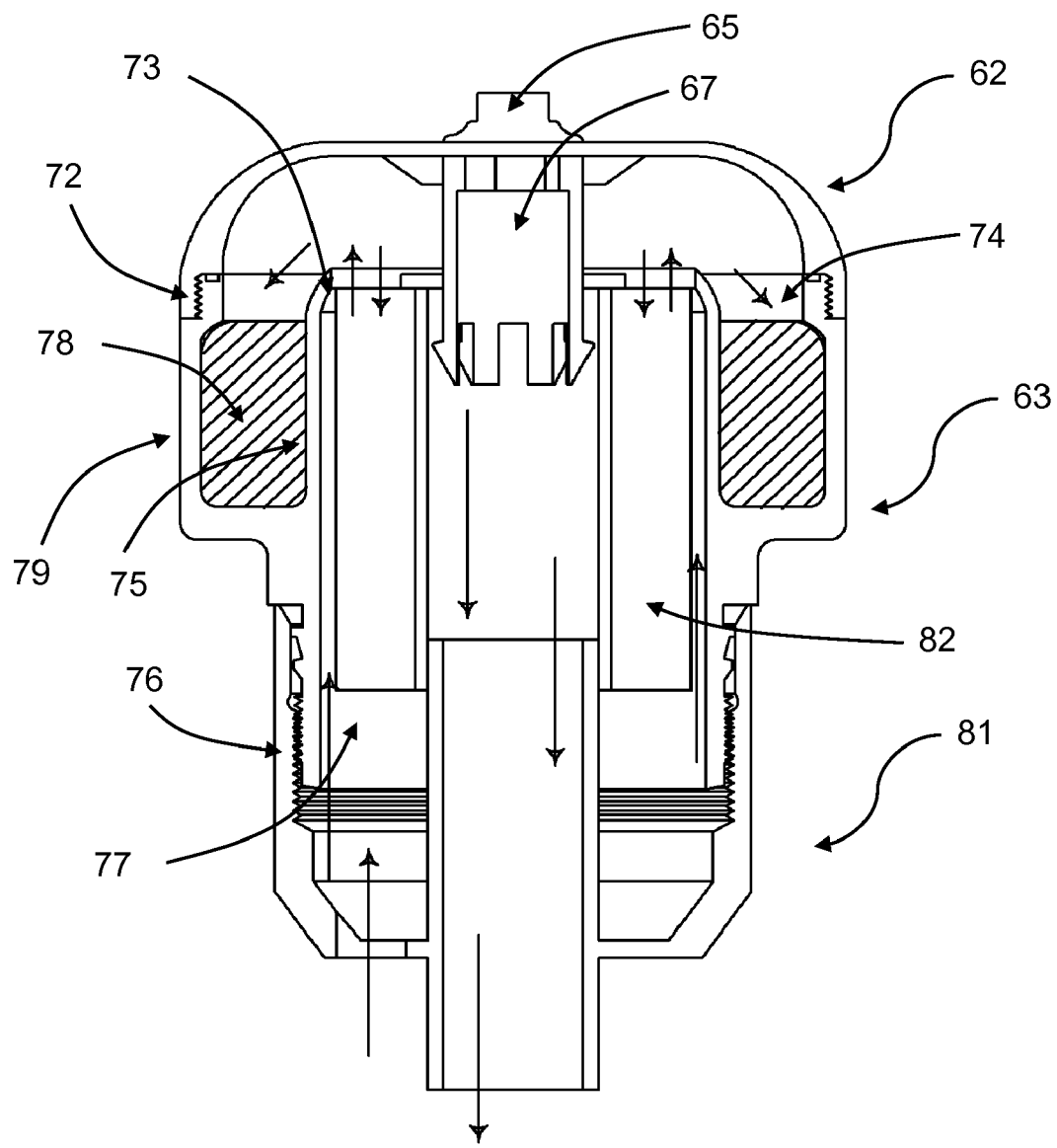
FIG. 7A is a schematic longitudinal section view through one form of additive delivery system of the present invention in an assembled state with fluid flow indicators.
Figure 7B:
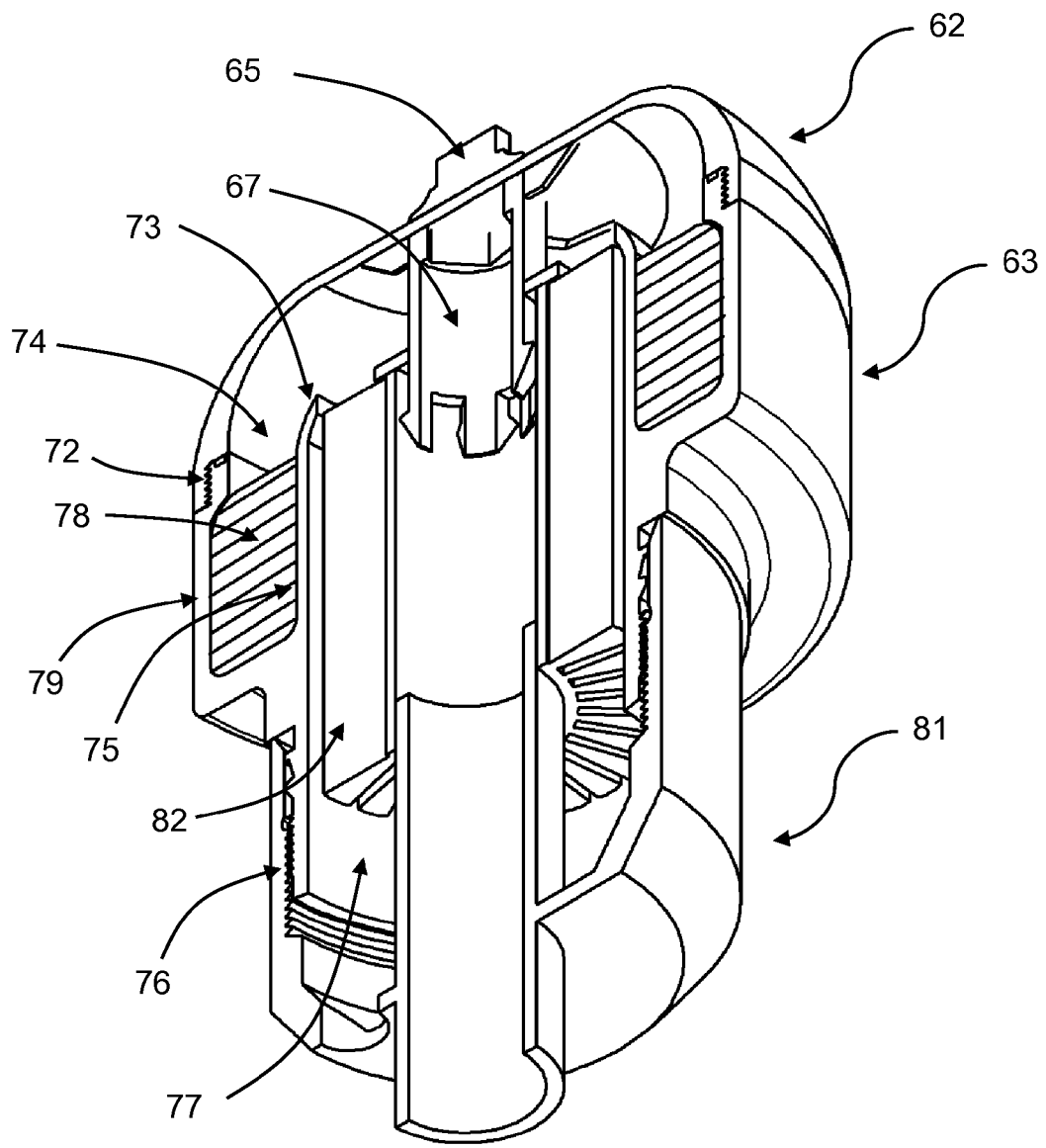
FIG. 7B is a perspective view of one embodiment of the additive delivery system of the present invention in an assembled state.

FIG. 7A is a schematic longitudinal section view through one form of additive delivery system of the present invention in an assembled state which may also represent the present invention when the integrated filter gel cap lid and body are fixed and cannot be separated. The arrows indicate the flow of the fluid being conditioned through the system. The filter body housing 81 and the filter media 82 are also shown. FIG. 7B shows a perspective view of the present invention. The same labels are used to identify the various features of the embodiments shown in FIGS. 7, 7A and B, unless otherwise noted.

FIG. 7A shows a cross section diagram of the present invention where the integrated gel filter cap lid 62 and the integrated gel filter cap body 63 are in an assembled state, where the integrated gel filter cap lid 62 is mounted on crown of integrated gel filter cap body 63 and the arrows indicate the flow of the fluid being conditioned through the system. The filter body housing 81 and filter media 82 are also shown.

In FIG. 7A the arrows indicate how the fluid from the device with which the filter is being used may flow within the filter, and more specifically within the integrated gel filter cap 61, as the fluid may pass through the filter housing interior 77, pass through the openings in the integrated gel filter cap's interior wall 75 and/or pass over the upper edge 73 of the interior wall 75, and into the annular space 74 containing the additive gel 78 where the fluid comes into contact with the additive gel 78 and then passes back through the openings in the integrated gel filter cap's interior wall 75 and/or passes over the upper edge 73 of the interior wall 75 and back to the filter housing space 77 and ultimately the connected device as filtered and conditioned fluid.

The fluid flowing through the filter housing body 81 will pass through a filter element 82 which may be fabricated of any suitable filtering medium and will return the fluid to the device. The fluid, as shown in FIG. 7A, will also pass into the integrated gel filter cap's additive gel containing annular space 74 where the fluid will come into contact with the gel 78 and then return to the filter housing. This indirect flow of fluid across the additive gel 78 located in the annular space 74 will result in the controlled dissolution of the additive components of the additive gel 78 into the fluid while maintaining the physical integrity of the additive gel. The present invention allows gels of various formulations, including relatively soft gels that would otherwise release additive components too quickly, release additive components at non-uniform rates, completely dissolve before the end of a desired service cycle, be broken up into gel fragments that would be carried by the fluid and potentially block device lines and orifices, or combination thereof to be used more effectively and in a wider range of applications.

The identifying features of the embodiments shown in FIG. 7A are similar to those described in FIG. 7 and are identified by the same labels.

Example

Into a container of the style shown in FIG. 7 and FIG. 7A, two equally spaced rows of 6 holes in each row, each hole measuring 5 mm in diameter, are drilled into the annular space wall. Into the annular space is placed a mixture of the following composition:

TABLE 1

Composition of Additive Gel

| Percent by Weight | Component |
| --- | --- |
| 13.2% | Olefin copolymer viscosity modifier |
| 47.8% | diluent mineral oil |
| 2.4% | ashless polyisobutylene succinic anhydride dispersant maleic anhydride styrene |
| 9.6% | copolymer, partially esterified |
| 100.0% | TOTAL |

The mixture is heated at 100 C for 8 hours to form a gel. The filled additive gel filter cap is mounted onto a cartridge-style filter media insert and this assembly is fit into a cartridge-style filter housing, thus providing an additive delivery system of the present invention.

The assembled filter cartridge and housing is placed on a dynamometer equipped with a PSA DV6 engine and run for 100 hours. At the end of the test, oil analysis shows that an amount of viscosity modifier equivalent to and increase in 0.4 cSt has been released into the oil compared to a baseline in which a standard filter with no additive gel present.

Although only a few embodiments of the present invention have been described above, it should be appreciated that many modifications can be made without departing from the spirit and scope of the invention. All such modifications are intended to be included within the scope of the present invention, which is to be limited only by the following claims.

What is claimed is:

1. A method for releasing additives into a fluid comprising the steps of
   (1) operating a device that utilizes a fluid, wherein the device further utilizes a delivery system for supplying one or more additives to a fluid wherein said delivery systems comprises an additive gel, a filter comprising a housing, and a fluid/gel chemistry exchange region, wherein the filter housing comprises a region that experiences a direct flow of the fluid as it passes through the filter housing, wherein the fluid/gel chemistry exchange region is located outside of the region of the filter housing that experiences the direct flow of the fluid where fluid passing through the filter housing will contact the gel in the fluid/gel chemistry exchange region; and
   (2) passing the fluid from the fluid-utilizing device into the filter housing and then passing the fluid into the fluid/gel chemistry exchange region of the filter housing where said fluid comes into contact with the additive gel, resulting in the release of additives from the gel to the fluid; and
   (3) returning said fluid to the fluid-utilizing device; and
   wherein the filter housing comprises a body and a cap, where the cap comprises an inner wall and an outer wall, wherein the inner wall forms a cylinder within the cap that connects to the outer wall at one end of the cap and is separate from the outer wall at the other end such that said cylinder is open at the other end of the cap of the cap; and wherein the inner wall and outer wall form an annular space along the outer wall of the cap and wherein the additive gel is placed within the annular space; wherein the cap fastens to the body of the filter housing forming the filter housing such that the cap is located on the filter housing at an opposite end of the filter housing that mounts onto said fluid-utilizing device; and
   wherein said fluid/gel chemistry exchange region is located within said cap.

2. The method of claim 1 wherein the interior wall that forms the annular gel-containing space contains one or more openings that allow fluid to pass from the filter housing into the annular space and contact the additive gel, and wherein the number, size, shape, orientation, location, pattern, or combinations thereof of the openings are utilized to control and maintain a desired additive gel component release rate and additive gel physical integrity.

3. The method of claim 1 wherein the interior wall that forms the annular gel-containing space forms an upper lip that acts as a diverter edge, wherein the diverter edge is designed to affect the fluid flow around the edge and so into the gel-containing annular space.

4. The method of claim 2 wherein at least some of the openings in the interior wall of the annular space are unobstructed by the additive gel inside the space so as to allow some of the fluid to enter the annular space through the openings and dissolve one or more additive components in the gel.

5. The method of claim 1 wherein the filter is a cartridge filter that is mounted inside the filter housing, where said filter housing has inlet and outlet passages for permitting fluid to flow through the housing and the cartridge.

6. The method of claim 1 wherein the device is an internal combustion engine, a natural gas engine, a stationary engine, a metal working coolant system, an industrial lubricated system, an oil or fuel filter, a hydraulic system, or a transmission systems.

7. The method of claim 1 wherein the filter is an oil filter and the fluid is engine lubricating oil.

8. The method of claim 1 wherein the device is a diesel passenger car engine.

* * * * *